United States Patent
Luers

(10) Patent No.: US 9,763,181 B2
(45) Date of Patent: Sep. 12, 2017

(54) METHOD AND MOBILE COMMUNICATION APPLIANCE FOR SELECTING A TRANSMISSION PATH

(71) Applicant: Unify GmbH & Co. KG, Munich (DE)

(72) Inventor: Jurgen Luers, Borchen (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

(21) Appl. No.: 14/706,230

(22) Filed: May 7, 2015

(65) Prior Publication Data
US 2015/0237570 A1    Aug. 20, 2015

Related U.S. Application Data

(63) Continuation of application No. 11/922,150, filed as application No. PCT/EP2006/063162 on Jun. 13, 2006, now abandoned.

(30) Foreign Application Priority Data

Jun. 29, 2005    (DE) .................... 10 2005 030 796

(51) Int. Cl.
*H04W 48/18*    (2009.01)
*H04W 72/08*    (2009.01)
*H04W 4/02*    (2009.01)

(52) U.S. Cl.
CPC ........... *H04W 48/18* (2013.01); *H04W 4/025* (2013.01); *H04W 72/08* (2013.01)

(58) Field of Classification Search
CPC ..... H04W 88/06; H04W 48/18; H04W 88/02; H04W 76/02; H04W 72/04; H04W 28/16; H04W 16/14; H04W 16/10; H04W 4/02; H04W 72/08; H04B 1/005; H04B 1/406; H04B 1/006; H04B 1/0057; H04M 2250/12; H04M 1/72522; H04M 1/72519; H04M 1/0214; H04L 29/08657; G01S 5/0252

(Continued)

(56) References Cited

U.S. PATENT DOCUMENTS 5,752,164 A    5/1998 Jones
5,974,328 A    10/1999 Lee et al.
(Continued)

FOREIGN PATENT DOCUMENTS

EP    1610576 A2    12/2005
WO    03063451 A1    7/2003
(Continued)

*Primary Examiner* — Kamran Afshar
*Assistant Examiner* — Nicole Louis-Fils
(74) *Attorney, Agent, or Firm* — Buchanan Ingersoll & Rooney PC

(57) ABSTRACT

There is described a method for selecting a transmission path for a communication connection of a mobile communication device, wherein at least two transmission paths can be selected by the mobile communication device. In a first step, an option is determined via the position of the communication device, in a second step, the option is accessed using the determined option on the data bank for the transmission path, in a third step, a preferred transmission path is determined using at least one entry of the data bank, and in a fourth step, the preferred transmission path is selected and used for the communication connection.

16 Claims, 1 Drawing Sheet

(58) Field of Classification Search
USPC .......... 455/450, 552.1, 553.1, 550.1, 456.1,
455/456.6; 370/329
See application file for complete search history.

(56) References Cited

U.S. PATENT DOCUMENTS

| | | | |
|---|---|---|---|
| 6,011,973 A | 1/2000 | Valentine et al. | |
| 6,085,085 A * | 7/2000 | Blakeney, II | H04W 8/183 455/426.1 |
| 6,974,328 B2 | 12/2005 | Aspe et al. | |
| 7,277,704 B2 | 10/2007 | Cooper | |
| 2002/0082044 A1 | 6/2002 | Davenport | |
| 2002/0168976 A1 | 11/2002 | Krishnan | |
| 2004/0073690 A1* | 4/2004 | Hepworth | H04L 12/2602 709/230 |
| 2004/0198374 A1 | 10/2004 | Bajikar | |
| 2004/0203893 A1 | 10/2004 | Kotzin | |
| 2004/0242240 A1* | 12/2004 | Lin | H04W 8/245 455/456.3 |
| 2006/0072542 A1* | 4/2006 | Sinnreich | H04L 12/2854 370/351 |

FOREIGN PATENT DOCUMENTS

| | | |
|---|---|---|
| WO | 03063541 A2 | 7/2003 |
| WO | 2005002248 A1 | 1/2005 |
| WO | 2005002261 A1 | 1/2005 |
| WO | 2005055633 A1 | 6/2005 |

* cited by examiner

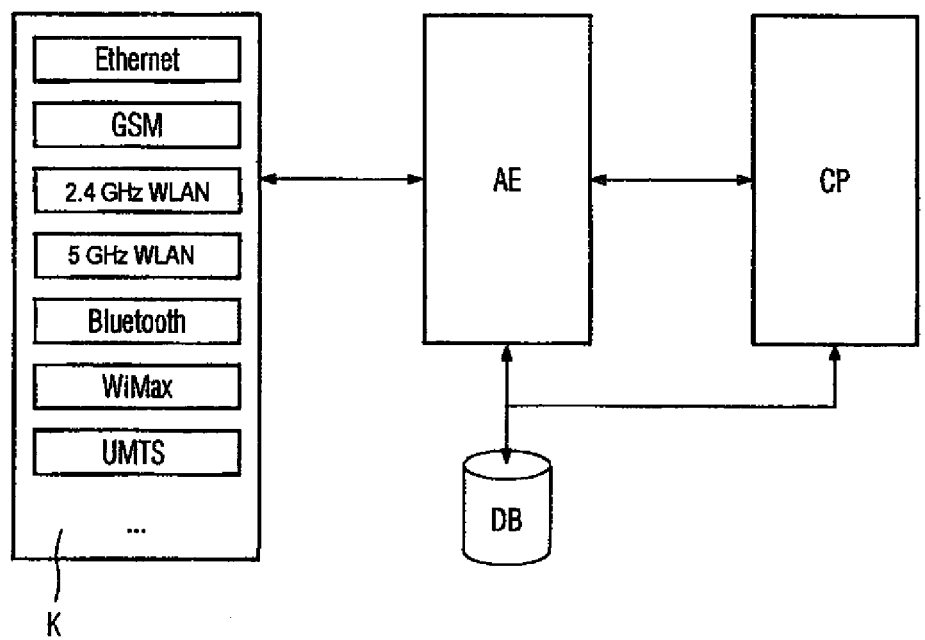

METHOD AND MOBILE COMMUNICATION APPLIANCE FOR SELECTING A TRANSMISSION PATH

CROSS REFERENCE TO RELATED APPLICATIONS

This application is a continuation application of U.S. patent application Ser. No. 11/922,150, which is the US National Stage of International Application No. PCT/EP2006/063162, filed Jun. 13, 2006 and claims the benefit thereof. The International Application claims the benefits of German application No. 10 2005 030 796.5 DE filed Jun. 29, 2005, both of the applications are incorporated by reference herein in their entirety.

FIELD OF INVENTION

The invention relates to a method for a mobile communication appliance and to a communication terminal for wirelessly accessing a plurality of transmission paths.

BACKGROUND OF INVENTION

There are frequently various radio-based voice networks and data networks available for mobile communication links. In this context, the radio-based voice networks, that is to say GSM networks, DECT networks and UMTS networks, for example, can also be used for data transmission, as can, conversely, radio-based data networks, that is to say WLAN networks, WiMax networks and Bluetooth networks, for example, can also be used for voice transmission (e.g. VoIP=Voice Over Internet Protocol).

While, in many cases, the same requirement (voice transmission, data transmission etc.) can thus be met in the same or a similar quality using different types of mobile networks and hence using different transmission paths, these transmission paths differ, however, in terms of the costs respectively related to their use, in terms of their bandwidth, the delay times, the reliability (connections being cut off) etc.

To be able to take hold in a specific situation between different transmission paths and their respective related advantages and drawbacks as required, what are known as multimodal mobile communication appliances are frequently used. By way of example, these are PCs which have both Bluetooth and WLAN transmission devices, or else mobile radios (telephones) which selectively support connections based on the GSM standard, the UMTS standard and/or the DECT standard. Before setting up a communication link, for example a telephone call, a user of such a communication appliance can thus select the transmission path which is to be used for the next communication link. Alternatively, it is also possible to permanently preset different transmission paths (GSM, GPRS, DECT) for different communication services (voice, fax, SMS, Internet WWW, etc.).

Frequently, a transmission path is also selected automatically by the communication appliances by checking the availability of the various transmission paths at the time at which a communication link is initiated. To this end, by way of example, a field strength measurement is used to check whether the various base stations of different transmission paths (for example DECT, WLAN) can be received. If it is available, the (inexpensive) WLAN network is then selected, for example, using a priority list, whereas a GSM mobile radio link is selected as the transmission path if a WLAN network or a DECT cell is not available.

The document US 2004/0242240 A1 Lin "Location Assisted Communications Mode Switching" discloses a method in which multimodal terminals take their geographical position as a basis for reading a preferred communication mode from a table and, if the terminal is in another communication mode, changing to this selected communication mode. This process is repeated at regular intervals of time.

The document U.S. Pat. No. 5,752,164 Jones "Autonomous Remote Measurement Unit for Personal Communications Service System" discloses a method for a communication network, in which different frequency channels of a wide frequency band can be used alternately for communication. In this case, the area in which the communication system is used is divided into a number of honeycomb-like regions, with interference on or use of the individual radio channels being measured for each region by means of measuring devices provided in each honeycomb and being stored in a central database. These measurements are preferably taken repeatedly and used to maintain the database formed thereby. When a mobile terminal is used, position-finding is performed for this terminal, and access to the database is used to establish which radio channels are free or have little interference, so that a free or low-interference radio channel can be used for communication.

The document U.S. Pat. No. 5,974,328 Lee et al. "Rapid System Access and Registration in Mobile Phone Systems" likewise discloses a database-based method for location-dependent configuration of a mobile terminal. In this case, a mobile terminal is supplied with respective optimized registration parameters for registration in a mobile radio network from a database on the basis of location.

SUMMARY OF INVENTION

In the case of the known methods and devices for selecting one of a plurality of transmission paths, it is found to be disadvantageous that the selected transmission path in many cases does not assure the required transmission quality, and/or although a high-quality transmission path is selected it is in many cases unnecessarily expensive. It is therefore an object of the present invention to improve the selection of a respective transmission path used when mobile communication appliances are used.

The object is achieved by a method in accordance with an independent patent claim and by a communication appliance in accordance with, a further independent patent claim.

The object is achieved by using a method for selecting a transmission path for a communication link from a mobile communication appliance, where the mobile communication appliance can select at least two transmission paths. In this context, a first step involves a statement about the location of the communication appliance being ascertained, a second step involves the ascertained statement being used to access a database for transmission paths, a third step involves at least one entry in the database being used to determine a preferred transmission path, and a fourth step involves the preferred transmission path being selected and being used for a communication link. The use of this method allows location-dependent selection of the transmission path, with the entry in the database being able to be used to prescribe various preferred transmission paths for various locations. To this end, statistical statements about previous uses of at least one of the transmission paths are used for the database, where at least one correlation between a statement about the location used during a previous use and a statement, picked up during the previous use, about the quality of the transmission path used is stored and used to select the transmission path. An "empirical database" of this kind means that it is possible to dispense with the use of a particular transmission path at a location at which this transmission path is known (from experience) to have frequent interference.

The object is also achieved by proposing a communication appliance for wirelessly accessing a plurality of transmission paths, one of the plurality of transmission paths being able to be selected for a communication link. In this context, the communication appliance is equipped with a position-finding device for ascertaining a statement about a geographical position of the communication appliance, and the communication appliance is equipped for accessing a database, the database having at least one entry with a statement, based on empirical values from past communication links, about a quality which can be expected for one of the transmission paths with at least one associated statement about a location. In addition, the communication appliance is equipped with a selection device for one of the plurality of transmission paths, the selection device being in a form such that the statement about the location and the at least one database entry are used to select and use a transmission path which corresponds to a minimum quality requirement. Such a communication appliance is always used to select that transmission path which, empirically, meets a prescribed minimum quality requirement for the location of the communication appliance. This means that it is always possible to select a transmission path which, although it is powerful enough, permits the most inexpensive and/or power-saving mode of operation possible for the communication appliance. To this end, a user advantageously defines various criteria as aims, for example cost criteria, energy criteria, time criteria (duration of connection setup, transmission time for a particular volume of data, delay times etc.).

Advantageous refinements of the inventive method are specified in dependent patent claims. The features and advantages described therein also apply mutatis mutandis to the inventive communication appliance.

In this case, the database may be stored in the communication appliance itself, which means that access to the database is particularly rapid and simple, and it is a simple matter to prevent manipulation of the database by third parties. On the other hand, a database which is available centrally in a communication network may also be used for this purpose, which means that a communication appliance can also use the empirical values and rules (routing rules) from other communication appliances. Finally, the parallel use of both a local and a central database is also advantageous in many cases, because it firstly allows redundancy requirements to be met, and secondly allows "one's own" entries to be used preferably, in order to be able to resort to the centrally stored entries if such entries "of one's own" are not present.

The structure of radio networks and their locally differing reception circumstances and also the time-variant utilization level of transmission paths can easily be taken into account by virtue of use of the selected transmission path being followed by a quality registered in the process for the transmission path and the statement about the location being used by the communication appliance for a fresh entry in the database and/or for correcting an existing entry in the database. In this context, the quality stored and taken into account may advantageously be a combination of individual criteria, e.g. costs, bandwidths, reliabilities (for example number of connections cut off per unit time), delay times (for example in the case of VoIP links) etc.

The data obtained through the continuous and automatic "care" of the entries in the database may advantageously also be used for optimizing a radio network to which an associated transmission path belongs. It is therefore possible in many cases to dispense with the separate measurement of radio areas and nevertheless to obtain a constantly up-to-date overview of radio ranges, "radio holes", field strength distributions or the like. In this case, it is also possible for a central location (for example a system administrator) to make changes in the data records in the database such that future selection decisions are influenced. This makes it possible to control the utilization level of individual connecting paths and to avoid bottlenecks.

If a time statement about the time and/or the time of day and/or a day-of-week statement is used to select the transmission path, the database providing statistical statements about the quality of at least one transmission path for a particular time and/or time of day and/or day of the week, it is also possible to take account of changes on the transmission paths which are recurrent on the basis of time. By way of example, this involves taking account of cases in which particular transmission paths (for example a company WLAN) have a high utilization level at particular times of day (for example during normal business hours) and therefore provide reduced bandwidth.

Manual input of location information into a communication appliance is avoided if the statement about the location of the communication appliance is ascertained using a satellite-assisted position-finding system (e.g. "GPS") and/or a method for position-finding using received terrestrial radio base stations (field strength and/or propagation-time measurements).

The inventive method can be used particularly flexibly and often universally if a WLAN radio network, a GSM mobile radio network and/or a UMTS voice data radio network is selected for the transmission path. Accessing these widespread transmission paths means that there is a high likelihood of one or even more transmission paths always being available for selection.

BRIEF DESCRIPTION OF THE DRAWINGS

Exemplary embodiments of the inventive method are explained below with reference to a sole drawing. They are simultaneously used to explain a communication appliance based on the invention.

In this context, the single FIGURE uses a schematic illustration to show a control device ("Call Processing"), a selection device and access units ("Connectors") for a communication appliance.

DETAILED DESCRIPTION OF INVENTION

The FIGURE shows a schematic illustration of components of a mobile communication appliance. In this case, the mobile communication appliance is what is known as a "smart phone", that is to say an appliance in which the functions of a mobile computer ("PDA"—Personal Digital Assistant) and the functions of a mobile radio (mobile telephone) are combined with one another. The communication appliance is in multimodal form, that is to say has access units K (connectors) for various radio networks, in this case GSM, WLAN, Bluetooth, WiMax, UMTS, etc. In addition, the communication appliance also has access units K for wired communication; for this, the FIGURE shows an Ethernet access unit by way of example.

The text below—unless a different description is given—simply assumes that each access unit K is associated with precisely one transmission method (GSM, Internet Protocol, ISDN . . . ), which means that the access units K in the FIGURE simultaneously represent transmission methods. In this case, a transmission method can be used to access a plurality of transmission paths; by way of example, a single GSM connector can be used to access a plurality of mobile radio networks (even with different network operators) and a single LAN port can be used to access different VoIP gateways/gatekeepers or the like. For reasons of further simplification, it is subsequently also assumed that each access unit IC has not only precisely one associated transmission method but also precisely one associated transmission path, which means that the reference symbols for the access units K simultaneously denote transmission methods and finally transmission paths.

The communication appliance also has a control device CP ("Call Processing") which the applications (not shown) on the communication appliance use as a control device and as an interface for external communication. In the present exemplary embodiment, the control device CP is a call processing unit for switching voice links, as is known from circuit-switched communication installations ("PBX"). Generally, however, it is also possible to use any other control device, for example, VoIP gatekeepers, e-mail distribution devices etc. or else multifunctional control devices for switching different data types and communication streams.

Whereas "conventional" monomodal communication appliances regularly involve the control device CP communicating only with a single access unit K, the control device CP in the present exemplary embodiment uses a selection device AE to access different access units K. To this end, the control device CP is in a form such that it sets up a communication link or a data channel to the selection device AE by transmitting not only a communication address (telephone number, IP address or the like) but also a statement about a quality requirement.

In the present exemplary embodiment, the statement about the quality requirement comprises a plurality of criteria. First, the control device CP uses internal signaling to notify the selection device AE of a type (type statement) for the next communication link on the basis of the application which requires the communication link (or data channel or the like). That is to say that for voice links, for example, there is different signaling than for the transmission of an e-mail message or an SMS message. In the case data applications (internet access or the like), it is also possible for a desired minimum bandwidth (for example 128 kbit/s) to be requested which is ascertained automatically or is input by a user.

From the point of view of the control device CP, the selection device AE works like a single access unit K. The selection device AE therefore "conceals" the peculiarities of the individual access units K which are actually present. It is therefore also possible and advantageous for only an abstract descriptor (e.g. the name) for the desired call party to be transmitted from the control device CP to the selection device AE instead of a specific communication address (telephone number, IP address). The subsequently selected transmission path and transmission method (and hence the access unit K to be used) are then used to retrieve the "appropriate" communication address from an address directory (preferably likewise stored in the database DB). It is therefore possible to change the transmission path and transmission method even during an ongoing call, for example from a VoIP link (with an IP address as communication address) to an ISDN link (with a "conventional" telephone number as communication address).

The selection device AE and the control device CP access a common database DB (empirical database), this database DB being integrated in the communication appliance DB in the present exemplary embodiment. As an alternative or in addition, it is naturally possible to use a network-assisted, central database DB for use by a plurality of communication appliances.

In another alternative refinement, it is also possible for different communication appliances to reciprocally access the databases on other communication appliances and to use the entries they contain for selecting an access unit K and hence a particular transmission path.

The text below describes the setup of a communication link by a communication appliance having the technical devices described above. To this end, the communication appliance has a technical device, a position-finding device which assures at least coarse geographical position-finding for the communication appliance. In the present exemplary embodiment, this is done by detecting the identification numbers ("base station IDs") of the various radio cells in whose reception area the communication appliance is currently active. The identification numbers and the reception field strengths of the respective radio cells are reported to the selection device AE by the various access units K at regular intervals of time. From the statements from the various access units K, the selection device AE creates an up-to-date location profile. Alternatively, position-finding is also possible using a satellite-assisted system, for example GPS. Finally, in cases in which up-to-date position-finding is not possible, a "default location" can be prescribed for different times of day (e.g. week days between 12.00 and 16.00 hours: in the office having the coordinates xy).

Preferably—as described below—a routing decision is made primarily on the basis of the current location and secondarily on the basis of other requirements. Alternatively, a distinction can also be drawn primarily on the basis of the type of user or use (private/business etc.), or cost or quality features are considered first. These settings can be influenced either by users or by an administrator, according to an authorization model.

It is subsequently assumed that a communication application is to be used to set up a video telephony link. To this end, the application with the task of doing so sends the control device CP a request message which transmits not only the type of communication link required (in this case: "real-time stream") but also a desired bandwidth (in this case: 192 kbits/full duplex) and an associated quality class (in this case: best quality=no connections being cut off if possible and little delay). On the basis of the requirements given, the selection device AE decides that only some of the available transmission paths and hence certain access units K are suitable for the communication link required, namely Ethernet, WLAN, WiMax and UMTS. To make this decision, the selection device AE loads a data record, describing the basic performance of the relevant access unit K and of the transmission path linked to it at the current location, from the database DB at least once for each available access unit K.

The selection device AE now ascertains the current availability of the previously selected access units K and hence of the transmission paths selected with them. This establishes that the access unit "Ethernet" is currently not available, that is to say that no Ethernet network port is connected or active.

Of the remaining access units K, the two WLAN access units (2.4 GHz; 5 GHz), the WiMax transmission path and the UMTS radio module are suitable for meeting the requirements transmitted with the request message.

The selection device AE therefore accesses the database DB again and loads a respective cost table for the suitable access units K in order to select the cheapest transmission path and hence the most suited access unit K according to the situation. In this context, it is optionally also possible to select the cheapest "provider" if an access unit K and hence a transmission method have a plurality of providers (service providers) and hence a plurality of transmission paths available (for example a plurality of GSM networks are available).

When the selection device AE has decided to use a particular access unit K (in this case the cheap 2.4 GHz WLAN is used), the desired connection is set up and the selection device awards the control device CP what is known as a "quality monitoring order". On the basis of the "quality monitoring order", the control device CP transmits a quality message, which is known as "feedback", which is also known as a "QoS (Quality of Service) data collection (QDC)", when the communication link previously set up has been terminated. With this quality message, the selection device AE receives statements about any connections which may have been cut off, the average, minimum and maximum transmission bandwidth and, if available, statements about the costs incurred. Together with the already available statement about the current location, the selection device AE uses these data to update the database DB, with a new data record first of all being created. Already available empirical values about the location and about the transmission path used may alternatively or additionally involve an existing data record being updated. When existing data records are updated, a filter algorithm ensures that "outliers", for example a single instance of a connection being cut off, do not result in the affected transmission path no longer being selected long term. At the same time, the filter algorithm ensures that "more recent" quality statements are given a higher weighting than statements from longer ago; this relates particularly also to cost statements, because providers are frequently changing the costs for their services. Statistical methods can thus be used to compile a plurality of data records.

In this case, the database DB has an optional interface to a network management system (not shown). Such network management systems allow an overview to be obtained about data infrastructures and in so doing are used for error searches and network planning. The QoS statements "automatically" ascertained when communication links are used and hence when transmission paths are used are—as described—used for constantly updating the database DB, so that the information in the database DB can be used as a replacement for complex separate network measurements.

Particularly in the case of configurations in which both local and central databases are used, regular alignment of the local databases and the central database allows a central stock of data to be set up and maintained which, by means of targeted evaluation, identifies infrastructure defects. Changes to the entries to the databases, for example by an administrator, then allow the "behavior" of communication appliances to be influenced, for example so that connecting paths with a low utilization level are preferred. The alignment described means that an entry at a central location, that is to say in a central database, is then sufficient even when local databases are used.

The invention claimed is:

1. A method of selecting a transmission path for a communication link of a mobile communication appliance comprising:
    populating, by the mobile communication appliance, a database of the mobile communication appliance with quality of transmission statements, each of the quality of transmission statements based on monitoring of a communication link having a transmission path used for that communication link that was performed by the mobile communication appliance during use of that communication link, each of the quality of transmission statements being correlated with a location at which the communication link of that quality of transmission statement was used by the mobile communication appliance, each of the quality of transmission statements relating to availability, reliability, and quality of the communication link obtained by the mobile appliance based on the monitoring of the communication link during use of that communication link performed by the mobile communication appliance;
    determining a current location of the mobile communication appliance;
    receiving, by the mobile communication appliance at the current location, a request message requesting establishment of the communication link for the mobile communication appliance;
    selecting, by the mobile communication appliance, a first transmission path from a plurality of available transmission paths available at the current location to form a communication link at the current location of the mobile communication appliance based on a comparison of user defined criteria and the quality of transmission statements of the database, wherein the selecting of the first transmission path comprises determining a plurality of currently available transmission paths that meet requirements for the communication link defined in the request message in response to receipt of the request message;
    monitoring, by the mobile communication appliance, the selected first transmission path when used as the communication link, the monitoring performed by the mobile communication appliance comprising:
        collecting quality of service data for the selected first transmission path that comprises information relating to bandwidth available to the mobile communication appliance during use of the selected first transmission path, and information relating to any cut-off connections experienced during use of the first transmission path;
    communicating between the mobile communication appliance and a central database that is available centrally in a communication network to align the central database with the database of the mobile communication appliance to influence behavior of the communication appliance to improve utilization of connection paths that can be available to the mobile communication appliance within the network;
    identifying network infrastructure defects from the central database based on data obtained from the database of the mobile communication appliance via alignment of the central database with the database of the mobile communication appliance;
    selecting, by the mobile communication appliance, a second transmission path to replace the first transmission path when the first transmission path is determined by the mobile communication appliance to no longer meet requirements for the communication link while the communication link is in use for an ongoing communication session, the selecting of the second transmission path being influenced by the alignment of the database of the mobile communication appliance with the central database;

replacing the first transmission path with the selected second transmission path for the communication link while the communication session is ongoing; and after the selecting of the second transmission path, updating the database of the mobile communication appliance with the collected quality of service data for the first transmission path for use of the updated database of the mobile communication appliance to select another transmission path to replace the second transmission path after the second transmission path has been used for the communication link.

2. The method of claim 1 wherein the central database is available centrally in the communication network such that the central database is usable by a plurality of other mobile communication appliances.

3. The method of claim 1, comprising:
storing, by the mobile communication appliance, quality of service data collected from the monitoring of the first transmission path.

4. The method of claim 1 wherein the user defined criteria is comprised of all of: statements about any connections which have been cut off, an average minimum transmission bandwidth, an average maximum transmission bandwidth, and cost information and wherein selecting the first transmission path is comprised of giving more preference to the quality of transmission statements of the database about the available transmission paths that are more recent than other quality of transmission statements of the database.

5. The method of claim 1 wherein the current location is determined using a satellite-assisted position-finding system or a method for position-finding using received terrestrial radio base stations.

6. The method of claim 1 wherein the first transmission path is selected from the group consisting of a wide local area radio network ("WLAN"), a cellular network, a voice data radio network, and a combination thereof.

7. The method as claimed in claim 1, wherein a time statement about a time of day is used to select the first transmission path, and
wherein the database of the mobile communication appliance provides statistical statements about the quality of at least one transmission path for the time of day.

8. The method of claim 1 comprising:
storing, by the mobile communication appliance, the database of the mobile communication appliance in non-transitory memory of the mobile communication appliance.

9. The method of claim 8 wherein the second transmission path is selected automatically during use of the first transmission path for the communication link.

10. The method of claim 1 wherein the user defined criteria is a pre-selected criteria based on at least one of cost, energy consumption of the mobile communication appliance, geographical location, requirements for minimum service, transfer delay, bandwidth, data volume, and reliability; and
wherein the user defined criteria is limited by a pre-selected criteria defined by at least one policy.

11. The method of claim 1, wherein the central database is accessible to a network management system.

12. A mobile communication appliance comprising:
a selection device configured to select a first transmission path from a plurality of available transmission paths to use in establishing a first communication link; and a control device configured to monitor the first transmission path while the first transmission path is in use to collect quality of service data for the first transmission path that comprises information relating to bandwidth available to the mobile communication appliance during use of the first transmission path, and information relating to any cut-off connections experienced during use of the first transmission path;

the selection device configured to ascertain a statement about a current location of the mobile communication appliance and accesses a database of the mobile communication appliance, the database comprising quality of transmission statements, each of the quality of transmission statements based on monitoring of a prior communication link having a transmission path used for the prior communication link that was performed by the control device during use of the prior communication link, each of the quality of transmission statements being correlated with a location at which the prior communication link of that quality of transmission statement was used by the mobile communication appliance, each of the quality of transmission statements relating to availability, reliability, and quality of the prior communication link obtained by the mobile appliance based on the monitoring of the prior communication link during use of the prior communication link performed by the mobile communication appliance;

the selection device configured to select the first transmission path from a plurality of available transmission paths available at a current location of the mobile communication appliance to form the first communication link at the current location in response to receipt of a request message requesting establishment of the first communication link such that a plurality of currently available transmission paths that meet requirements for the communication link defined in the request message is determined in response to receipt of the request message and selection of the first transmission path is also based on a comparison of user defined criteria and the quality of transmission statements of the database;

the mobile communication appliance configured to communicate with a central database available centrally in a communication network to align the database of the mobile communication appliance with a central database that is available centrally in the communication network to influence behavior of the communication appliance for transmission path selection to improve utilization of connection paths that can be available to the mobile communication appliance and to facilitate identification of network infrastructure defects from the central database via alignment of the central database with the database of the mobile communication appliance; and the selection device configured to select a second transmission path to replace the first transmission path for the first communication link while the first communication link is utilized for an ongoing communication session when the first transmission path is determined to no longer meet requirements for the first communication link based on monitoring of the first transmission path performed by the control device after the first communication link is established and while the first transmission path is used for the first communication link of the ongoing communication session such that selection of the second transmission path is influenced from alignment of the database of the mobile communication appliance, the control device configured to send at least a portion of the collected quality of service data to the database of the mobile communication appliance after the second transmission path is selected to replace the first transmission path as the first communication link while the communication session is ongoing.

13. The mobile communication appliance of claim 12 comprising:

access units communicatively connectable to the selection unit, each of the access units connectable to a respective network having a respective transmission protocol such that each of the access units is configured to connect to networks having a transmission protocol that is different from transmission protocols of networks to which the other access units are connectable; and wherein the mobile communication appliance is configured so that changes to the database are makeable by a central device of a network.

14. The mobile communication appliance of claim 12 wherein the control device is configured to populate the database of the mobile communication appliance with a quality of transmission statement based on monitoring of the first communication link performed by the control device while that communication link was used by the communication appliance.

15. The mobile communication appliance of claim 12 wherein the user defined criteria is comprised of all of: statements about any connections which have been cut off, an average minimum transmission bandwidth, an average maximum transmission bandwidth, and cost information and wherein selecting the first transmission path is comprised of giving more preference to the quality of transmission statements of the database about the available transmission paths that are more recent than other quality of transmission statements of the database.

16. The mobile communication appliance of claim 12 wherein the selection device is configured to use a time statement about a time of day to select the first transmission path, and wherein the database of the mobile communication appliance provides statistical statements about the quality of at least one of the available transmission paths for the time of day.

\* \* \* \* \*